June 23, 1964 — L. M. FINGERSON — 3,138,025
HIGH TEMPERATURE PROBE
Filed July 18, 1960 — 5 Sheets-Sheet 1

INVENTOR.
LEROY M. FINGERSON
BY Moore, White & Burd
ATTORNEYS

June 23, 1964 L. M. FINGERSON 3,138,025
HIGH TEMPERATURE PROBE
Filed July 18, 1960 5 Sheets-Sheet 4

INVENTOR.
LEROY M. FINGERSON
BY Moore, White & Burd
ATTORNEYS

June 23, 1964  L. M. FINGERSON  3,138,025
HIGH TEMPERATURE PROBE

Filed July 18, 1960  5 Sheets-Sheet 5

INVENTOR.
LEROY M. FINGERSON
BY
Moore, White & Burd
ATTORNEYS

United States Patent Office 3,138,025
Patented June 23, 1964

3,138,025
HIGH TEMPERATURE PROBE
Leroy M. Fingerson, St. Paul, Minn., assignor to the Regents of the University of Minnesota, Minneapolis, Minn., a corporation of Minnesota
Filed July 18, 1960, Ser. No. 43,376
15 Claims. (Cl. 73—339)

This invention relates to a heat flux probe for measuring properties in high temperature fluids such as those encountered in combustion processes, in gaseous exhaust streams, jets and rockets and the like. Basically, the invention depends upon the instantaneous measurement of the rate of heat transfer to a small surface of known temperature.

The heat flux probe is made of a material with a very high electrical resistivity and low thermal conductivity, such as glass or ceramic, which is coated with a metallic film. A cooling fluid is forced through the probe and an electrical current is utilized to maintain the outside film at a constant temperature. Changes in the properties of the fluid medium surrounding the probe are sensed by changes in the amount of current necessary to keep the metallic film at a constant temperature. Thus, the basic operation of the high temperature probe of this invention involves maintaining a constant heat flux to a cooling fluid in the probe by utilizing an electrical circuit to correct changes due to variations in surrounding fluid properties.

The heat flux probe of this invention is useful both for indicating properties of fluids maintained at a steady state and as an instrument for measuring rapidly fluctuating properties. The probe is useful for the measurement of temperatures, velocities, concentrations and like properties of fluids. One exemplary use of the device is the measurement of high temperatures. The probe may be calibrated to accurately measure fluid temperatures for fluids of varying thermodynamic properties. In dealing with fluctuating properties, frequency responses of up to 100,000 cycles per second are possible.

The heat flux probe of the present invention is characterized by a high frequency response, a small measurement area and extreme simplicity of operation. These characteristics make it adaptable for use in many varied applications. Among these may be mentioned research and testing and control of jet engines and rockets; steam boiler research, testing and operation; direct temperature determination of hot gases in open hearth furnaces and Bessemer converters; in gas cooled nuclear piles and plasma jets; and the like.

The principal object of this invention is to provide a heat flux probe of simple operation, small measurement area and high frequency response.

A further object of this invention is to provide a probe of high electrical resistivity and low thermal conductivity provided with internal cooling means and outside electrical conducting means adapted to measure temperature changes by sensing variations in amount of electrical current necessary to maintain the conducting means at a constant temperature.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which.

Referring now to the drawings, and particularly to FIGURES 1 to 4, there is shown one form of probe device according to the present invention. The probe, indicated generally at 10, includes an elongated oval or eliptical tube 11 terminating in a heavy metallic nose 12. Tube 11 is desirably formed from stainless steel or like material, whereas the nose 12 is desirably formed from a more highly heat conductive material such as copper or silver or the like. Tube 11 is desirably joined to the nose 12 through the medium of a brass plate 13 which is secured to the end of the tube by means of solder 14 and to the nose by means of solder 15. An internal tube 16, coaxial with tube 11, is also secured by means of solder 17 to the plate 13.

Figures 1, 2, 3, 4:
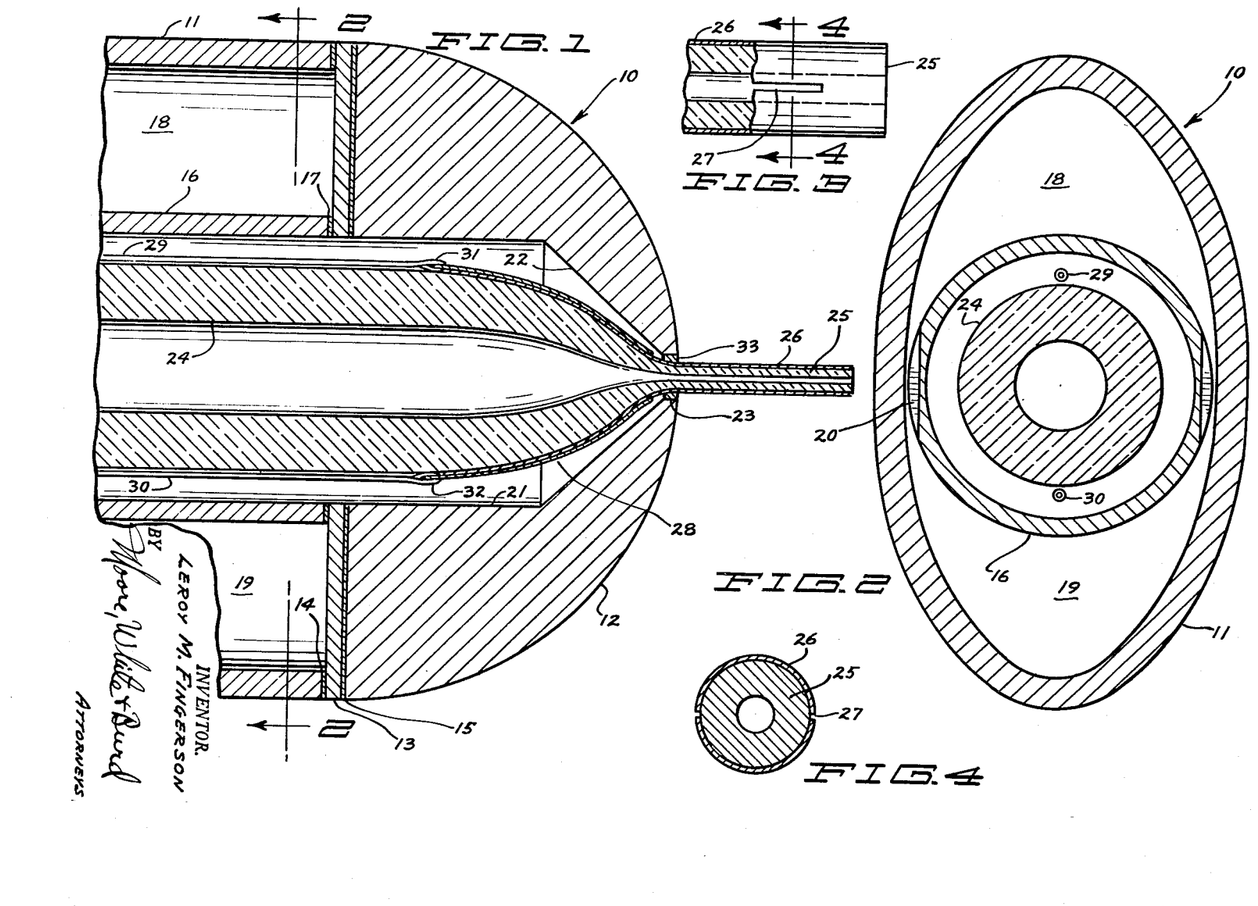
FIGURE 1 is an elevation, in section and greatly enlarged, showing one form of heat flux probe according to the present invention.
FIGURE 2 is an end section taken on the line 2—2 of FIGURE 1 and in the direction of the arrows.
FIGURE 3 is a further enlarged elevation, partly in section, of the probe tip.
FIGURE 4 is an end sectional view taken on the line 4—4 of FIGURE 3 and in the direction of the arrows.

The inner tube 16 being circular in cross section within oval tube 11 and having an outside diameter substantially that of the smaller inside diameter of the oval tube defines two longitudinal passageways 18 and 19 for the circulation of a cooling fluid, such as water. Communication between the channels 18 and 19 is accomplished by the provision of notches or grooves 20 in the outside surfaces of inner tube 16 adjacent its end near the nose 12. Thus, for example, cooling water circulated through channel 18 may pass through the notches or grooves 20 and be discharged through channel 19, or vice versa.

Nose 12 is provided with an internal cavity 21 of generally circular cross section communicating directly with the inside of tube 16 and having approximately the same inside diameter. The end of the cavity 21 opposite from the tube 16 is tapered, as indicated at 22, and terminates in a small annular opening 23 in the tip of the nose. A glass tube 24 is positioned within the tube 16 substantially concentric therewith. The free end 25 of glass tube 24 is drawn down to an extremely fine tip 25 which extends through the opening 23 and projects out from the face of the nose 12.

The drawn end of tube 24 and tip 25 is provided with a thin metallic coating 26 of platinum or similar highly electrical conductive material. As best shown in FIGURES 3 and 4, the metallic coating 26 is applied in a pattern to permit flow of current to the end of the tip and back from the end of the tip. This current flow is accomplished by providing an uncoated area 27 separating the areas covered by metallic coating 26 into two parts in all areas except that immediately adjacent to the free end of the tip 25. The glass tip 25 has an outside diameter of approximately 0.010 inch. To insure good electrical contact a somewhat heavier plated layer 28 is applied over the tapering portion of the glass tube between the tube body and the tip on top of the platinum layer. This thicker heavier coating is also of an electrically conductive metal, such as copper or silver.

A pair of insulated electrical conductor wires 29 and 30 extend in the space between the outside surface of glass tube 24 and the inside surface of steel tube 16 and are connected, as by solder joints 31 and 32, to the metallic coating 28. The metal coated tip of the glass tube is electrically insulated from the metal nose 12 by means of suitable electrically insulating material 33 in the opening 23 between the nose body and glass tip. Glyptal resin is a suitable material for this purpose.

In use the probe is placed with its nose in the path of the fluid stream whose temperature is desired to be measured. The nose is streamlined so as to have minimum disturbing effect on the fluid stream. A cooling fluid is circulated through the channels 18 and 19, coming in one channel and exiting through the other and passing through grooves 20 adjacent the nose. At the same time a cooling fluid is passed through tube 24 and out through the open tip 25. Electrical current is applied to the metallic coatings 26 and 28 through the wires 29 and 30. As explained hereinafter, the temperature is calculated from the current required to maintain the metallic film at a constant temperature.

Figures 5, 6:
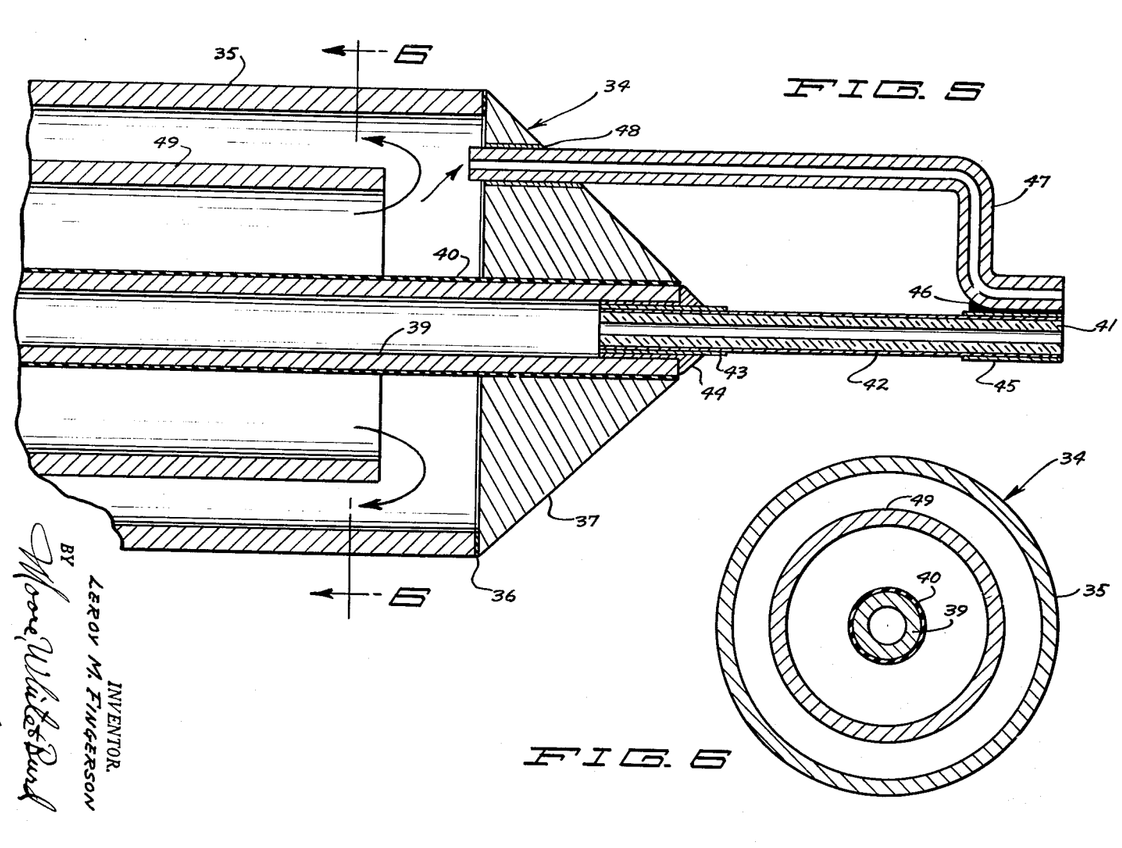
FIGURE 5 is a fragmentary and greatly enlarged elevation, in section, of a modified form of probe.
FIGURE 6 is an end elevation, in section, taken on the line 6—6 of FIGURE 5 and in the direction of the arrows.

Referring now to FIGURES 5 and 6, there is here shown an alternative form of straight tube probe design. This form of probe, indicated generally at 34, includes an outer elongated stainless steel tube 35 soldered or similarly connected, as at 36, to a nose 37 of copper or like heat conducting metal. Nose 37 has a central opening of circular cross section into which there is fitted an inner tube 39 provided with an outer electrically insulating layer 40. Fitted into the end of inner tube 39 in the end of nose 37 is a fine glass tube 41 having its outer surface provided with a coating 42 of platinum or like conductive metal.

The inner end of glass tube 41 is desirably provided with a heavier plated coating 43 of copper or silver or like conductive metal and is secured by solder 44 in the open end of the inner steel tube 39. The opposite end of glass tube 41 is also provided with a heavier coating 45 of silver or copper or the like on top of the platinum plating 42 and is secured by means of solder 46 to a further bent stainless steel tube 47 whose opposite end extends through nose 37 and is secured thereto by means of solder 48.

The current flow in this embodiment of the probe is through the insulated inner tube to the probe tip as the incoming lead. The metallic tube 47 attached to the end of the probe's sensitive unit is grounded along with the outside shell of the probe.

An intermediate tube 49 concentric with outer tube 35 and inner tube 39 is provided for the purpose of cooling. A cooling fluid, such as water, is introduced through the annular channel between the intermediate tube 49 and the inner tube 39 and is then discharged in the outer annular channel between the intermediate tube and the outer tube 35. A portion of this cooling water may be discharged out through the metallic tube 47. At the same time cooling fluid may be introduced through inner tube 39 for discharge out through the plated sensitive tip of the probe. The ejected cooling fluid is in such a fine stream and the temperatures with which the device is used are so high that the effect of the cooling fluid being ejected into the stream whose temperature is being measured is negligible. A typical embodiment of this form of the invention utilizes a stainless steel probe tube 35 having an outside diameter of 0.134 inch and a glass tube 41 having an outside diameter of 0.010 inch.

Referring now to FIGURES 7 through 11, there is shown an alternative form of probe having an internal flow path for return of cooling fluid from the temperature sensitive element. This return path probe is indicated generally at 50. The probe includes an outer elliptical or oval tube 51 connected to a heavy metal nose 52. The oval tube is desirably of stainless steel and the nose is desirably of copper and the two are joined together, desirably through a brass plate 53 secured to the tube 51 by means of a ring of solder 54 and to the nose by means of a layer of solder 55. The probe includes an inner tube 56 substantially coaxial with outer tube 51. The inner tube 56 is joined by means of solder 57 to the plate 53.

Figures 7, 8, 9, 10, 11:
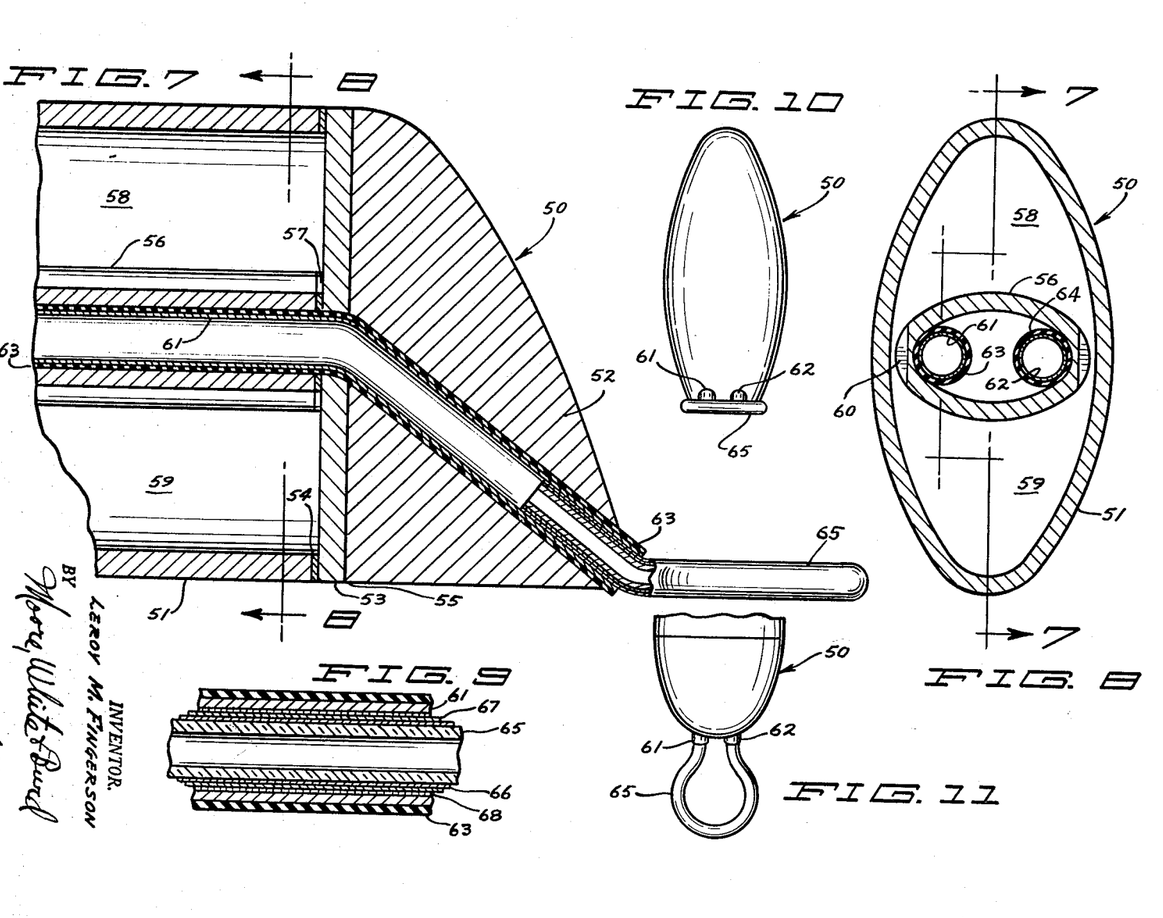
FIGURE 7 is an elevation, in section and greatly enlarged, of a still further form of probe device.
FIGURE 8 is an end elevation, in section, taken on the line 8—8 of FIGURE 7.
FIGURE 9 is a fragmentary elevation, in section and further enlarged, showing construction of the sensing element fitted into the body of the probe.
FIGURE 10 is an end view on somewhat reduced scale of the probe of FIGURES 7 and 8.
FIGURE 11 is a top plan view of the probe of FIGURE 10.

The space between the outer tube 51 and the inner tube 56 defines a pair of longitudinal channels 58 and 59 through which cooling fluid may be circulated. Communication between channels 58 and 59 is had by means of a pair of notches or grooves 60 in the outer surface of the inner tube at the end adjacent the nose 52. The inner tube 56 carries a pair of metal tubes 61 and 62 formed of stainless steel or like material and provided with an outer layer of electrically insulating material 63 and 64, respectively. The tubes 61 and 62 extend through the nose 52, being insulated therefrom by means of the insulating layers 63 and 64.

A sensing loop 65 extends between the tubes 61 and 62. The sensing loop 65 is in the form of an arcuate glas stube provided with a surface coating 66 of platinum or like material. The free ends of the loop, which extend into the metallic tubes 61 and 62, are provided with a heavier plated coating of copper or silver or the like and the ends of the loop are secured by means of a layer of solder 68 into the ends of the tubes 61 and 62 adjacent the surface of the nose body 52.

In use, the path of current flow to the sensitive loop 65 is by means of the insulated metal tubes 61 and 62. These same tubes carry the circulating cooling fluid which enters through one tube, passes through the sensitive element and is discharged out through the other tube. The probe body is maintained cool by fluid entering through one of the channels 58 or 59 passing through the grooves 60 adjacent the nozzle nose and then being discharged out through the other channel.

Figure 12:
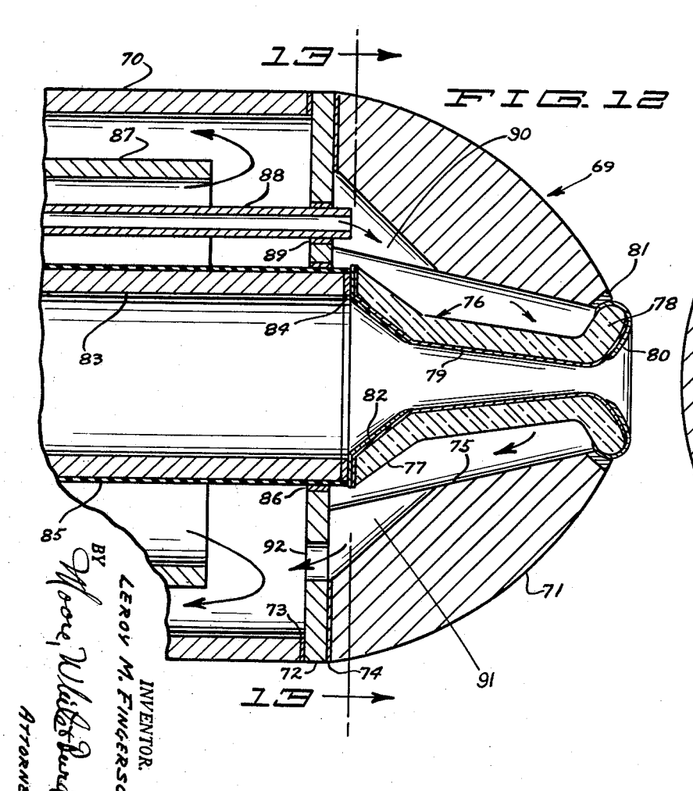
FIGURE 12 is a fragmentary elevation, in section and greatly enlarged, of a still further modified form of probe adapted to measure the temperature of gases of fluids drawn through the probe.
Figure 13:
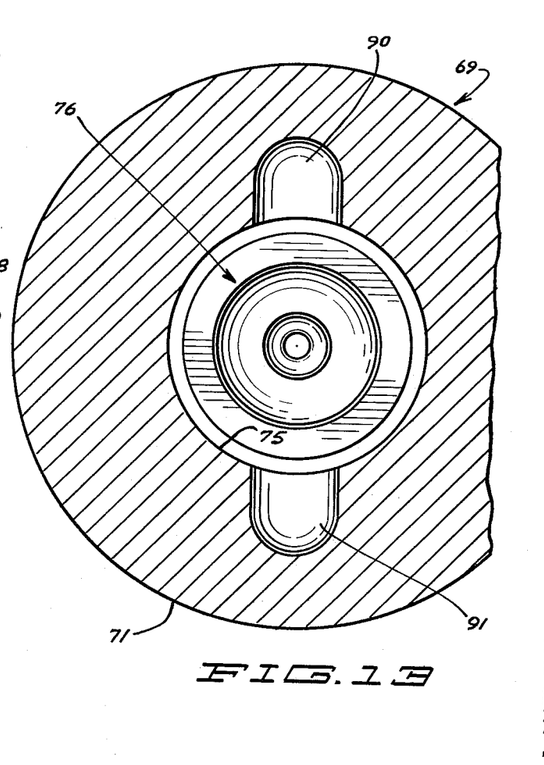
FIGURE 13 is a fragmentary cross section on the line 13—13 and in the direction of the arrow.

In FIGURES 12 and 13, there is shown a further modified form of high temperature probe adapted to be used where the fluid whose temperature is to be measured may be drawn into and through the probe. This embodiment of the probe device is indicated generally at 69. The probe 69 includes an outer tube 70 of stainless steel or the like and a heavier nose 71 of copper or like highly heat conductive metal. Tube 70 is desirably secured to a brass plate 72 by means of a ring of solder 73. Plate 72 in turn is secured to the nose 71 by means of a layer of solder 74. The nose 71 is provided with a central annular tapered opening 75 extending through the nose body. Within this opening there is positioned a glass or ceramic tubular sensitive element 76.

The sensing element 76 is generally in the form of a nozzle tapering gradually from wider toward the inside of the probe to narrower toward the outside and is provided with a flaring annular lip 77 toward the inside and a flaring annular lip 78 at the outside. The internal surfaces of the sensitive element are provided with a plate layer 79 of platinum or like conductive metal. A somewhat heavier plated layer 80 of copper or silver or like electrically conductive metal is applied over the outside flaring lip 78 of the sensitive member. The sensitive element is secured in electrically conductive contact with the body of the nose 71 by means of a ring of solder 81. The inside flaring lip of the sensing member is also provided with a plated layer 82 of copper or silver or similar electrically conductive metal of somewhat greater thickness.

An inner tube 83 of stainless steel or like metal, concentric with outer tube 70, is positioned to extend through plate 72 into the nose 71 where it is attached by means of a ring of solder 84 to the sensing element 76. Inner tube 83 is provided with an outer layer 85 of electrically insulating material. The insulated inner tube is secured to the plate 72 by means of a ring of adhesive 86 which is impervious to the cooling fluids and to heat and is electrically insulating.

For cooling, an intermediate tube 87 is provided between outer tube 70 and inner tube 83, substantially concentric therewith. The intermediate tube 87 extends to just short of the nose. Flow of cooling fluid is permitted in the inner annular channel between the intermediate tube 87 and the inner tube 83 toward the nose and this fluid is discharged in the outer annular channel between the intermediate tube 87 and the outer tube 70. To provide cooling for the sensing element a further cooling tube 88 is provided. Tube 88 extends through the annular channel between inner tube 83 and intermediate tube 87 and extends through an opening in a plate 72 where it is secured by solder or adhesive 89 and extends into a transverse channel 90 which is in communication with the annular opening 75 in the nose 71.

Cooling fluid is introduced through the tube 88 into the annular channel 90 from where it is permitted to circulate around the outer perimeter of the sensing element and the cooling fluid is then discharged through a further transverse channel 91 in the nose and out through an opening 92 in plate 72 for discharge with the cooling fluid in the annular channel between the intermediate and outer tubes. In this embodiment of the probe the inner metal tube 83 functions as the incoming lead. The outer tube 70 is the ground and the sensitive element is in contact with it through the solder connection 81 and nose 71.

Figure 14:
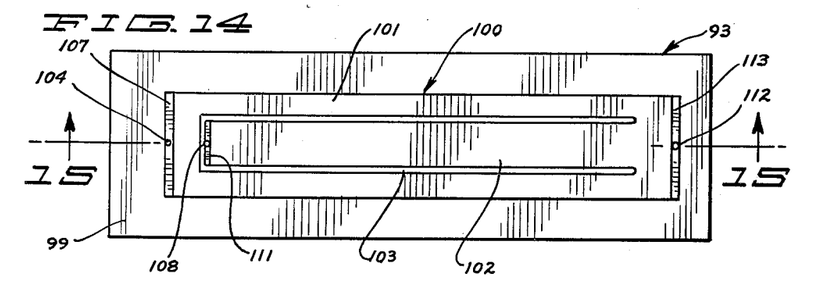
FIGURE 14 is a top plan view of a still further modified form of probe device adapted to measure temperatures of fluids against a surface into which the probe is fit.
Figure 15:
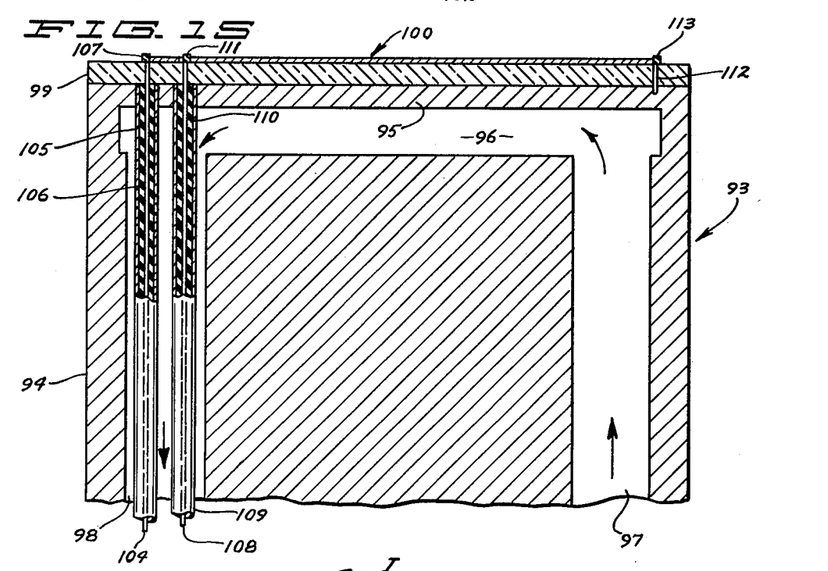
FIGURE 15 is an elevation, in section, of the probe of FIGURE 14.

In FIGURES 14 and 15 there is shown another embodiment of the high temperature probe of this invention, indicated generally at 93, and adapted to be fitted flush in a surface to measure the temperature of fluids in contact with the surface. This form of probe includes a metallic body 94 having a face surface of configuration adapted to fit flush with the surface exposed to the fluids whose temperature is to be measured. Although in the present embodiment of this surface face is indicated as being planar it may obviously be other shapes, such as concave, convex, etc., as required. Similarly, although the sensing face of the probe is shown as rectangular it may take other geometrical forms. For example, it may be circular and the body of the probe may be externally threaded to fit the probe into a threaded opening in a wall exposed to fluids whose temperatures are desired to be measured. The wall of the housing 95 underlying the exposed face is relatively thin and immediately underlying it is a chamber 96 for passage of cooling fluid. A pair of channels 97 and 98 extend through the body 94 in communication with the chamber 96 for introduction and discharge of cooling fluid.

A ceramic plate 99 overlies the face wall of the probe body. The ceramic plate is provided with a plated sensing layer 100 of platinum or similar electrically conductive metal. The plating 100 is applied in a discontinuous linear pattern providing for an outer conducting path 101 which functions as part of a guard circuit and an inner conducting path 102 which functions as part of the measuring circuit. The guard circuit is for the purpose of preventing the sensitive element from losing heat by conductivity to its supporting members. The guard circuit is maintained by resistance heating at a temperature corresponding to that of the fluid environment to which the sensitive measuring circuit is exposed. The conducting paths are separated by an elongated U-shaped non-conducting space 103. A coaxial lead including a central wire conductor 104 and an outer tubular conductor 105 spaced by insulating material 106 extends through one of the cooling fluid channels 98. The outer conductor 105 is in electrical contact with the probe body. The inner conductor 104 extends through the ceramic plate 99 and is in contact with the outer conducting path 100 on the sensing face. To insure good contact a heavier plated layer 107 in the nature of a bus bar is applied.

A second coaxial conductor including an inner conductor wire 108 and an outer tubular conductor 109 spaced by insulating material 110 provides contact with the inner conducting path of the sensing face. The tubular conductor 109 is in electrical contact with the probe body and the inner conductor 108 extends through the ceramic plate 99 and is in contact with the plating of the inner path 102. A heavier plated layer 111 of copper or silver or the like is applied to insure good contact and current distribution. The metallic coating on the sensing element is grounded by means of a conducting metallic pin 112 extending through the ceramic plate 99 into electrical contact with the probe body 94. Here too, a heavier plating 113 of copper or silver or the like in the nature of a bus bar is applied. This form of probe may be mounted flush in wall, at the stagnation point of a cylinder, or at other possible locations to get a direct measurement of heat transfer.

Figure 16:
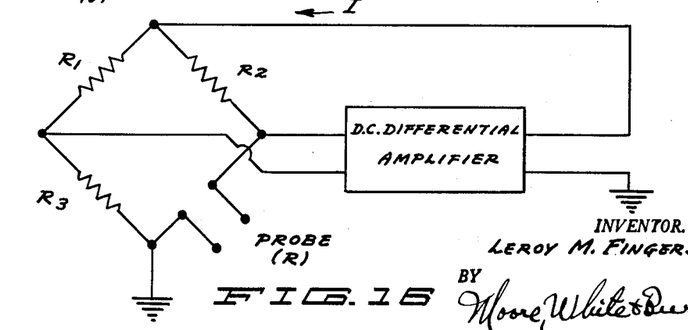
FIGURE 16 is a simplified schematic circuit diagram illustrating the functioning of the probe of this invention.

In FIGURE 16 there is shown in simplified schematic form a circuit diagram with which the high temperature probe of the present invention is calibrated and used to indicate temperature values. The circuit is a balancing circuit of the Wheatstone-bridge type in which the probe (R) is an unknown resistance and including three other resistances ($R_1$, $R_2$ and $R_3$) whose resistances are adjustable and known. In the operation of the probe it is desired that the probe be maintained at constant resistance. The temperature probe is made part of the circuit by connecting the leads of the probe conductors to the open contacts shown in the diagram. The circuit is of the automatic self-balancing type.

The sensitive element of the probe is exposed to the fluid whose temperature is to be measured. The probe is protected against the high temperatures of that fluid by circulation of the cooling fluid through the probe. Electric current is applied to the metallic film of the sensitive element. It is desired to maintain the metallic film at a constant temperature and this is done by varying the current to the film in order to maintain constant temperature. The resistance of the metallic film varies with the temperature to which it is exposed. Its resistance increases as the temperature of the surrounding fluid rises and its resistance decreases as the temperature falls. As the resistance of the metallic film increases less current is required to maintain the temperature of the film, and as the resistance decreases due to drop in surrounding temperature, a greater amount of current is required to maintain the metallic film at constant temperature. These variations in current are automatically compensated for and the variations may be observed, measured and recorded.

The resistances in the circuit are in the following relationship:

$$\frac{R_1}{R_3} = \frac{R_2}{R}$$

where the elements are identified as in the circuit diagram. Assuming this relationship, if the resistance R of the sensitive element of the probe varies under influence of the temperature of the fluid to which it is exposed, the circuit immediately becomes unbalanced. This unbalance signals a change in current to the metallic film of the probe to compensate for the change in resistance due to change in temperature to restore the former resistance of the metallic film and bring the circuit back into balance.

The precise structural form of the probe according to this invention will vary, depending upon the environment in which it is to be used. Where the fluid, whose temperature is to be measured, is a moving stream, the sensitive element of the probe is desirably disposed so as to interrupt the flow of the stream, but at the same time is streamlined in shape to minimize this interruption. The probe housing is conveniently in the form of a screw threaded plug which may be inserted in a threaded opening in the wall of the structure confining the fluid whose temperature is to be measured. Suitable connections are made for continuous circulation of cooling fluid through the probe to protect it against the high temperatures of its environment. As is apparent from the description, the probe structure is necessarily shown many times its actual size. The specific dimensions referred to are illustrative only and do not constitute limitations on the invention.

Although the probe of this invention has been described primarily with respect to its use in measuring temperatures the utility of the device is by no means so limited. It is capable of detecting and measuring other properties of fluids, such as velocity and concentration. The probe is primarily a heat flux meter. In many applications the heat flux rate alone is all that is necessary to give a measure of the total enthalpy of the gas. It can be used directly for qualitative comparison in different parts of the fluid. To obtain quantitative results, for example, in determining heat transfer to boiler tubes by utilizing the probe, the heat transfer to the probe can be related to that of the boiler tube by straight dimensional analysis. The actual heat transfer can be measured as accurately as the metering equipment allows.

The heat transfer to a cylinder can, for a large velocity range, be expressed as:

$$Q = 2\pi l k [0.42(Pr)^{0.2} + 0.57(Pr)^{0.33}(Re)^{0.50}](t_s - t_g) + c(t_s - t_w)$$

where:

Q is heat transfer indicated by circuit
$l$ is length of probe, ft.
$k$ is thermal conductivity of fluid, B.t.u./ft.-° F.-hr.
Pr (Prandtl number) is $\nu/\alpha$ (3600)
Re (Reynolds number) is $Vd/\nu$
$\nu$ (nu) is kinematic viscosity of fluid, ft.$^2$/sec.
$\alpha$ (alpha) is thermal diffusivity of fluid, ft.$^2$/hr.
V is velocity of fluid, ft./sec.
$d$ is diameter of probe, ft.
$t_g$ is temperature of fluid, ° F.
$t_s$ is probe surface temperature, ° F.
$t_w$ is cooling fluid temperature, ° F.
$c$ is overall average heat transfer coefficient from probe surface to cooling fluid, B.t.u./hr.-° F.

This equation can be rewritten in simplified form as:

$$Q = (A + B\sqrt{\nu})(t_g - t_s) + c(t_s - t_w)$$

where:

A is $2\pi l k (0.42)(Pr)^{0.2}$
B is $2\pi l k (0.57)(Pr)^{0.33} (d/\nu)^{0.5}$

In constant temperature flow A and B are constant. In this case the velocity can be obtained from the heat transfer Q. With proper linearizing networks on the output the velocity can be read out directly. For a constant and high velocity air stream the power is nearly directly proportional to temperature since, for diatomic gases, B is approximately constant. For low velocity streams the factor A becomes important and must be considered. When both temperature and velocity vary two probes held at different surface temperatures and utilizing two electrical circuits are used. Feeding the output to proper computing equipment permits the velocity and temperature to be obtained independently and directly.

When temperatures only are desired the problem of probe sensitivity to velocity can be avoided by mounting the probe across a sonic flow orifice. The sensitive element is mounted so that the fluid is drawn by vacuum through the orifice and around the sensitive element. Since at sonic conditions:

$$V = \sqrt{\gamma g R_0/MT}$$

where:

$\gamma$ (gamma) is ratio of specific heats, $C_p/C_v$
$C_p$ is specific heat of fluid at constant pressure B.t.u./lb.-° F.
$C_v$ is specific heat of fluid at constant volume B.t.u./lb.-° F.
$g$ is acceleration of gravity, ft./sec.$^2$
$R_0$ is the universal gas constant
M is the molecular weight of the gas
T is temperature of fluid, ° R. (Rankine)
Accordingly the probe indicates total temperature.

If large concentration fluctuations are present these also give rise to variations in probe signals. For the majority of combustion processes the system contains about 70% nitrogen and the molecular weight fluctuations of the other 30% of the constituents are small. In rocket engines, however, this is not the case and the third variable would have to be considered.

If the conditions expected to be encountered in the environment in which the probe is to be used can be reproduced in an experimental set up the probe can readily be calibrated and the accuracy of the results are limited only by the accuracy of the calibration. This calibration can be carried out with a steady state device. In other words, the probe is calibrated by making observations when the probe is exposed to known conditions. If the probe cannot be calibrated accuracy is dependent on the accuracy of the heat transfer relation used and how well the gas properties not being measured are known. In systems with very large temperature fluctuations high accuracy is not possible. However, utilizing presently available apparatus high frequency temperature changes can be detected with optical equipment only after a great deal of trouble and even then only the presence of the changes is detectable, the actual magnitudes not being available. Where small temperature fluctuations are present or where velocity measurements are made in a constant temperature fluid considerably higher accuracy can be achieved with the heat flux probe of this invention.

Many variations in operating procedure are available to get the required data. In gas streams having a temperature of 1000° F. or less the probe surface temperature can be operated close to the gas temperature. The unit is then sensitive to temperatures but relatively insensitive to velocity. Alternatively, the sensitivity to velocity can be increased by having a large temperature differential between probe and fluid.

The actual maximum environmental conditions the probe can withstand have no fixed limits and are entirely dependent upon the probe design. The maximum heat flux rates are dependent upon the efficiency of the internal cooling of the probe. This can be optimized by using metal tubes having a thin nonconductive high temperature coating with the sensitive metallic film on the surface of the nonconductor. With the glass tube construction, substantially as described and illustrated, and with mercury cooling the maximum heat flux is about 6.7 B.t.u./in.$^2$-sec. which corresponds for example to a velocity of 3000 ft./sec. and a temperature of 4000° F. With water cooling, due to possible surface boiling, maximum heat flux is about 1.1 B.t.u./in.$^2$-sec. which corresponds to about 2920° F. at 100 ft./sec. In each instance lowering the velocity increases the maximum temperature, and vice versa, for a given heat flux. These values are based on a probe 0.10 in. long, 0.010 in. outside diameter having a hole diameter of 0.005 inch. The pressure for computing the boiling point was taken as atmospheric and laminar flow in the tube was assumed.

The use of the heat flux probe according to the present invention is illustrated by the following examples. These examples are for illustrative purposes only and do not constitute a limitation on the invention.

*Example I*

The frequency response of the probe was tested utilizing a flame ball generator. In this device flame balls are generated by intermittently igniting, by means of a spark, a homogeneous combustible mixture issuing from a two inch diameter flow nozzle. The flame balls give an essentially step change in temperature since only a laminar flame front of thickness less than one millimeter separates the hot burned gas from the cold unburned gas. The combustible gas used was a stoichiometric mixture of propane and air. The burned gas temperature equaled 3500° R. The gas issued from the nozzle at a velocity of 80 ft./sec. The probe used was of the type illustrated in FIGURES 1 to 4. The probe tip was 0.11 inch long and 0.008 inch in diameter. This tip was mounted such that the combustible mixture flowed perpendicular to the probe and the center line of the issuing jet interrupted the probe about midway along its length. The distance from the ignition point to the probe tip was about one foot and at that distance the flame balls had grown to about 0.35 inch in diameter when they reached the probe. The probe was connected to a D.C. amplifier for frequency response compensation as shown in FIGURE 16. The cooling jacket and probe were both connected to water supplies for cooling. The voltage across the probe was fed into the vertical deflection plates of an oscilloscope. The voltage across the probe varied as follows:

(1) For cold flow the voltage was constant at about 34 volts. This represents power input which is converted to heat on the probe surface and from there transferred to both the cooling water in the probe and the cold gas flowing past the probe.

(2) In the laminar flame front region, or the edge of the ball, the power input rapidly decreased to about 12 volts. The time for this decrease was about 10 microseconds.

(3) While the probe was in the center region of the flame ball, or hot gas, the voltage level remained substantially at 12 volts. In terms of heat this means that much of the necessary heat flux to keep the probe at the predetermined temperature is now coming from the hot gases surrounding the probe.

(4) As the hot gases pass the probe and the probe is again exposed to cold flow the oscilloscope trace returns to the 34 volt level in about 10 microseconds. This whole operation of the flame ball passing the probe took place in only 350 microseconds or 0.000350 second.

*Example II*

The probe has been used for investigating the temperature distribution of burning city gas issuing from a circular pipe with an inside diameter of 0.30 inch. The probe was used by moving it across the flame to investigate the temperatures in various parts of the flame. The probe was connected to a D.C. amplifier, as previously described, and the cooling jacket and probe were connected to running water for cooling. The output or voltage across the probe was connected to an oscilloscope for visual observation. The probe had no difficulty in withstanding the high temperatures of the flame indefinitely. The voltage varied rapidly. The power input was greater in the cooler portions of the flame and rapidly decreased as the probe was moved to the hotter portions of the flame.

*Example III*

Further experiments were conducted in an effort to determine the maximum heat flux of the probe. No test equipment is presently available to determine the maximum environmental conditions the probe can withstand. However, since the probe itself does not know whether the source furnishing heat to its surface is a surrounding high temperature gas or the electric current in the metallic film of the sensing element a measure of the maximum environmental condition can be determined by observing the maximum power input to the probe before either the probe itself or the cooling system fails. This was done by cooling the probe with water and measuring the current through the probe and the voltage across the probe just before the heat flux became high enough to cause the cooling water to boil on the inside surface of the tubular probe. The observed result converted to heat flux rates was 1.2 B.t.u./in.$^2$-sec. which compares favorably with the value previously indicated for water cooling. The actual maximum heat flux and therefore maximum temperatures and/or velocities which the probe can detect and measure is a function only of the maximum cooling rate of the probe surface and the power available from the surface. The value found is representative only of the actual probe being tested with a given flow rate of a given cooling fluid. The range of environmental conditions under which the probe is effective can be extended by the use of more efficient cooling fluids.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A system for the measurement of properties of fluids, said system including a self-balancing Wheatstone bridge circuit having as one resistance a temperature probe, said probe comprising a body including a temperature sensitive area for exposure to the fluid whose properties are to be measured and having a base composed of a material having high electrical resistivity and low thermal conductivity and a metallic electrically conductive surface coating thereon, conducting means within the probe body in electrical contact with said conductive surface coating, conductive leads connecting said conducting means into said current for application of electric current to said conductive surface coating for the resistance heating thereof to maintain the same at a predetermined constant temperature less than the temperature of the environment of the fluid whose properties are to be measured whereby heat may be transferred from the environment to the conductive surface coating, channel means within said probe body and extending immediately adjacent to said temperature sensitive area, said channel means adapted for connection to a source of cooling fluid for the circulation of cooling fluid through the probe body for the positive direct cooling of said body and positive direct cooling of said temperature sensitive area, and means for measuring the amount of current required to maintain the conductive surface coating at the predetermined constant temperature.

2. A system according to claim 1 further characterized in that said probe body is generally hollow and tubular and is provided at one end adjacent the temperature sensitive area with a nose of substantial thickness formed from a highly heat conductive metal.

3. A system according to claim 1 further characterized in that the base of said temperature sensitive area is composed of a ceramic material having high electrical resistivity and low thermal conductivity.

4. A system according to claim 1 further characterized in that said electrically conductive surface coating is composed of a thin film of platinum plating on said base and a superimposed layer of copper on part of said platinum in electrical contact therewith.

5. A system according to claim 1 further characterized in that said temperature sensitive area is tubular in form for passage of cooling fluid therethrough, said tubular temperature sensitive area extends outwardly from said probe body and said electrically conductive surface coating is disposed on the outside surface of said tubular extension.

6. A system according to claim 5 further characterized in that said tubular temperature sensitive area extending out from said probe body is open at the end for ejection of cooling fluid therefrom.

7. A system according to claim 5 further characterized in that said tubular temperature sensitive area extending out from said probe body is in the form of a closed loop for circulation of cooling fluid from said body through said tubular element and back to said probe body.

8. A system according to claim 1 further characterized in that said electrically conductive surface coating is disposed on said base in a discontinuous linear pattern separated by electrically non-conductive spaces to provide a current flow path along the surface of said temperature sensitive area.

9. A system according to claim 8 further characterized in that said conducting means are wires extending through said probe body and connected in electrical contact with the surface of said electrically conductive coating at remote points in said current flow path defined by the discontinuous pattern of the conductive coating.

10. A system according to claim 7 further characterized in that said conducting means are a pair of conductive metal tubes disposed within and electrically insulated from said probe body, one end of each of said tubes being in electrical contact with said closed loop tubular temperature sensitive area, said tubes being adapted to the circulation of cooling fluid through said tubular temperature sensitive area.

11. A system according to claim 6 further characterized in that one end of said tubular temperature sensitive area extending out from said probe body is in electrical contact with a metal electrically conductive tube extending through said probe body and electrically insulated therefrom and the other end of said tubular temperature sensitive area is in direct electrically conductive contact with said probe body.

12. A system according to claim 1 further characterized in that the channels within the probe body for circulation of cooling fluid include at least two parallel but spaced apart channels having communicating passage means adjacent said temperature sensitive area.

13. A method of detecting and measuring properties of fluids which comprises exposing to the fluid whose properties are to be measured a temperature sensitive area having a base composed of a material having high electrical resistivity and low thermal conductivity and a metallic electrically conductive coating thereon, applying electric current to said conductive coating to maintain the same at a predetermined constant temperature, simultaneously cooling said temperature sensitive area by subjecting to a cooling fluid, and measuring the amount of current required to maintain the conductive coating at constant temperature.

14. A method according to claim 13 further characterized in that said conductive coating is maintained at a predetermined constant elevated temperature less than the temperature of the environment of the test fluid whose properties are to be measured, whereby heat is transferred from the environment to the temperature sensitive area.

15. A method according to claim 14 further characterized in that said temperature sensitive area is cooled by circulation of the cooling fluid adjacent the conducting coating and at least part of the cooling fluid is ejected into the environment of the test fluid through the temperature sensitive area.

References Cited in the file of this patent

UNITED STATES PATENTS

| | | |
|---|---|---|
| 2,512,462 | Marsten | Dec. 10, 1946 |
| 2,612,047 | Nilsson et al. | Sept. 30, 1952 |
| 2,870,305 | Ling | Jan. 20, 1959 |

UNITED STATES PATENT OFFICE
CERTIFICATE OF CORRECTION

Patent No. 3,138,025

June 23, 1964

Leroy M. Fingerson

It is hereby certified that error appears in the above numbered patent requiring correction and that the said Letters Patent should read as corrected below.

Column 4, line 44, for "glas stube" read -- glass tube --; column 12, line 44, for "2,512,462" read -- 2,412,462 --.

Signed and sealed this 27th day of October 1964.

(SEAL)
Attest:

ERNEST W. SWIDER
Attesting Officer

EDWARD J. BRENNER
Commissioner of Patents